(12) United States Patent
Hirano et al.

(10) Patent No.: US 11,137,048 B2
(45) Date of Patent: Oct. 5, 2021

(54) TRANSMISSION MECHANISM

(71) Applicant: UNIVANCE CORPORATION, Kosai (JP)

(72) Inventors: Kotaro Hirano, Kosai (JP); Yasuyuki Nishiyama, Kosai (JP); Hironobu Aoki, Kosai (JP)

(73) Assignee: Univance Corporation, Kosai (JP)

( * ) Notice: Subject to any disclaimer, the term of this patent is extended or adjusted under 35 U.S.C. 154(b) by 141 days.

(21) Appl. No.: 16/315,301

(22) PCT Filed: Jul. 7, 2017

(86) PCT No.: PCT/JP2017/025035
§ 371 (c)(1),
(2) Date: Jan. 4, 2019

(87) PCT Pub. No.: WO2018/008756
PCT Pub. Date: Jan. 11, 2018

(65) Prior Publication Data
US 2019/0234491 A1 Aug. 1, 2019

(30) Foreign Application Priority Data

Jul. 8, 2016 (JP) .............................. JP2016-135975

(51) Int. Cl.
*F16H 3/083* (2006.01)
*F16H 3/091* (2006.01)
(Continued)

(52) U.S. Cl.
CPC ............. *F16H 3/083* (2013.01); *F16H 3/091* (2013.01); *F16D 11/14* (2013.01); *F16H 2003/0933* (2013.01); *F16H 2200/0034* (2013.01)

(58) Field of Classification Search
CPC .. F16H 3/083; F16H 3/091; F16H 2003/0933; F16H 3/08; F16H 2200/0034; F16D 11/14; F16D 23/14
(Continued)

(56) References Cited

U.S. PATENT DOCUMENTS 3,419,120 A * 12/1968 Stott .................. F16D 23/0606
192/53.331
4,136,575 A 1/1979 Labat

FOREIGN PATENT DOCUMENTS

DE 10 2010 025 192 A1 12/2011
EP 2 762 757 A2 8/2014
(Continued)

OTHER PUBLICATIONS

Extended European Search Report for related EP Application No. 17824359.8, dated Dec. 11, 2019, 7 pgs.
(Continued)

*Primary Examiner* — William C Joyce
(74) *Attorney, Agent, or Firm* — Young Basile Hanlon & MacFarlane, P.C.

(57) ABSTRACT

A transmission mechanism includes a first gear coaxially fixed to a rotational shaft having a hollow shape, a second gear, and a third gear. The second and third gears are rotatably and coaxially disposed on an outer periphery of the rotational shaft such that the second and third gears are opposed to each other. A gear select clutch is disposed between the second and third gears, and configured to select one of a state in which the second and first gears are coupled and the third and first gears are decoupled, and a state in which the third and first gears are coupled and the second and first gears are decoupled. A clutch operation unit is configured to couple an operation shaft disposed in a hollow part of the rotational shaft to operate the gear select clutch
(Continued)

by advancing and retreating the operation shaft in an axial direction.

4 Claims, 7 Drawing Sheets

(51) Int. Cl.
*F16D 11/14* (2006.01)
*F16H 3/093* (2006.01)

(58) Field of Classification Search
USPC .......................................................... 74/371
See application file for complete search history.

(56) References Cited

FOREIGN PATENT DOCUMENTS

| | | | |
|---|---|---|---|
| JP | S54-030175 U | | 2/1979 |
| JP | S58-045450 U | | 3/1983 |
| JP | H07-009859 A | | 1/1995 |
| SU | 1765576 | * | 9/1992 |

OTHER PUBLICATIONS

English translation of International Preliminary Report on Patentability in PCT/US2017/025035, dated Jan. 17, 2019, 6 pgs.

* cited by examiner

TRANSMISSION MECHANISM

TECHNICAL FIELD

The present invention relates to a transmission mechanism which is mounted in a vehicle or the like.

BACKGROUND

For example, a technology of JP Patent Publication H7-9859 A is known as a transmission mechanism that transmits a rotational force, which has been transmitted from a driving source to an input shaft, to an output shaft by selecting one of a pair of gears.

In the transmission mechanism of JP Patent Publication H7-9859 A, a pair of gears is rotatably and coaxially disposed on an outer periphery of the output shaft, and a coupling sleeve for coupling the pair of gears to the output shaft is disposed. In addition, by performing a gear change operation for coupling the coupling sleeve to one of the paired gears, the rotational force, which has been transmitted to the input shaft, is transmitted to the output shaft via the one of the paired gears.

BRIEF SUMMARY

In the meanwhile, in the transmission mechanism of JP Patent Publication H7-9859 A, a lever mechanism, which couples the coupling sleeve to one of the paired gears is disposed on the outside of the coupling sleeve. Thus, a space in which the lever mechanism operates has to be provided around the coupling sleeve, resulting in an increase in size of the transmission mechanism.

Accordingly, if the transmission mechanism of JP Patent Publication H7-9859 A is used as a transmission mechanism for a vehicle, there is a problem in the aspect of in-vehicle mountability.

Thus, the object of the present invention is to provide a transmission mechanism which can achieve reduction in size.

According to an aspect of the present invention, there is provided a transmission mechanism including: a first gear coaxially fixed to a rotational shaft having a hollow shape, a second gear and a third gear, the second gear and the third gear being rotatably and coaxially disposed on an outer periphery of the rotational shaft such that the second gear and the third gear are opposed to each other; a gear select clutch disposed between the second gear and the third gear, and configured to select one of a state in which the second gear and the first gear are coupled and the third gear and the first gear are decoupled, and a state in which the third gear and the first gear are coupled and the second gear and the first gear are decoupled; and a clutch operation unit configured to couple an operation shaft disposed in a hollow part of the rotational shaft to the gear select clutch to operate the gear select clutch by advancing and retreating the operation shaft in an axial direction.

According to the transmission mechanism of one embodiment of the present invention, the gear select clutch is disposed between the second gear and third gear, and the clutch operation unit that operates the gear select clutch includes the operation shaft which is disposed in the rotational shaft. Since a mechanism which controls a gear change does not exist on the outside of the rotational shaft, second gear and third gear, a small-sized, compact transmission mechanism can be obtained.

DETAILED DESCRIPTION

Next, with reference to the accompanying drawings, a first embodiment according to the present invention will be described. In the following description of the drawings, the same or similar reference signs are assigned to the same or similar composing elements. However, it should be noted that the drawings are schematic and relations between thicknesses and planar dimensions, ratios among thicknesses of respective layers, and the like are different from actual ones. Therefore, specific thicknesses and dimensions should be determined in consideration of the following description. It should also be noted that the drawings include portions having different dimensional relationships and ratios from each other.

In addition, the first embodiment, which will be described below, indicate devices and methods to embody the technical idea of the present invention, and the technical idea of the present invention does not limit the materials, shapes, structures, arrangements, and the like of the constituent components to those described below. The technical idea of the present invention can be subjected to a variety of alterations within the technical scope prescribed by the claims.

Figure 1:
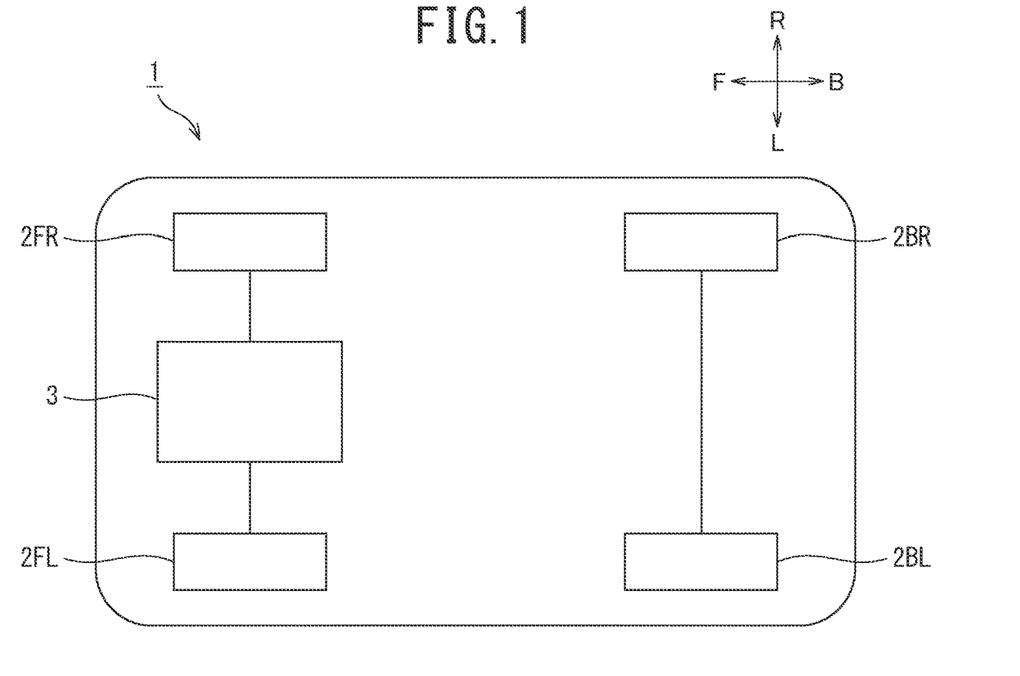
FIG. 1 is a view schematically illustrating a first embodiment of a vehicle according to the present invention.

FIG. 1 schematically illustrates a vehicle 1 according to the present invention. A double-headed arrow F-B in FIG. 1 indicates a front-and-rear direction of the vehicle 1, and a double-headed arrow L-R indicates a left-and-right direction of the vehicle 1.

The vehicle 1 is a hybrid vehicle which includes a front unit 3 that drives front wheels (a left front wheel 2FL and a right front wheel 2FR), and which is equipped with driving forces of an engine and motor generators.

Figure 2:
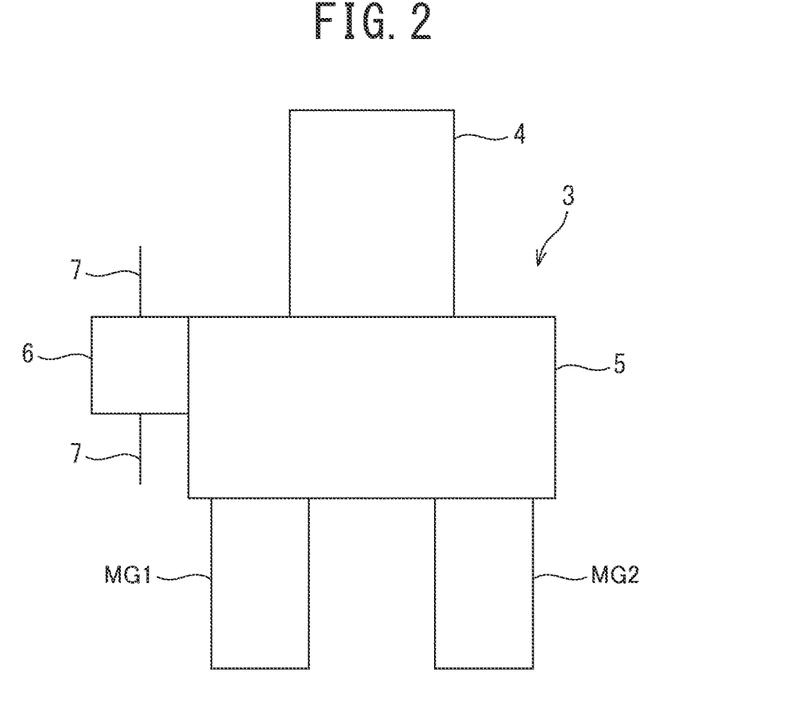
FIG. 2 is a view schematically illustrating a front unit which is mounted in the vehicle according to the first embodiment.

The front unit 3, as illustrated in FIG. 2, includes a first motor generator MG1 which operates as an electric motor and a generator; a second motor generator MG2 which similarly operates as an electric motor and a generator; an engine 4; a transmission 5 to which the first and second motor generators MG1 and MG2 and the engine 4 are coupled; and a differential 6 which is driven by an output of the transmission 5. Axles 7, which extend from the differential 6 in the left and right directions of the vehicle 1, are coupled to the left front wheel 2FL and right front wheel 2FR.

Figure 3:
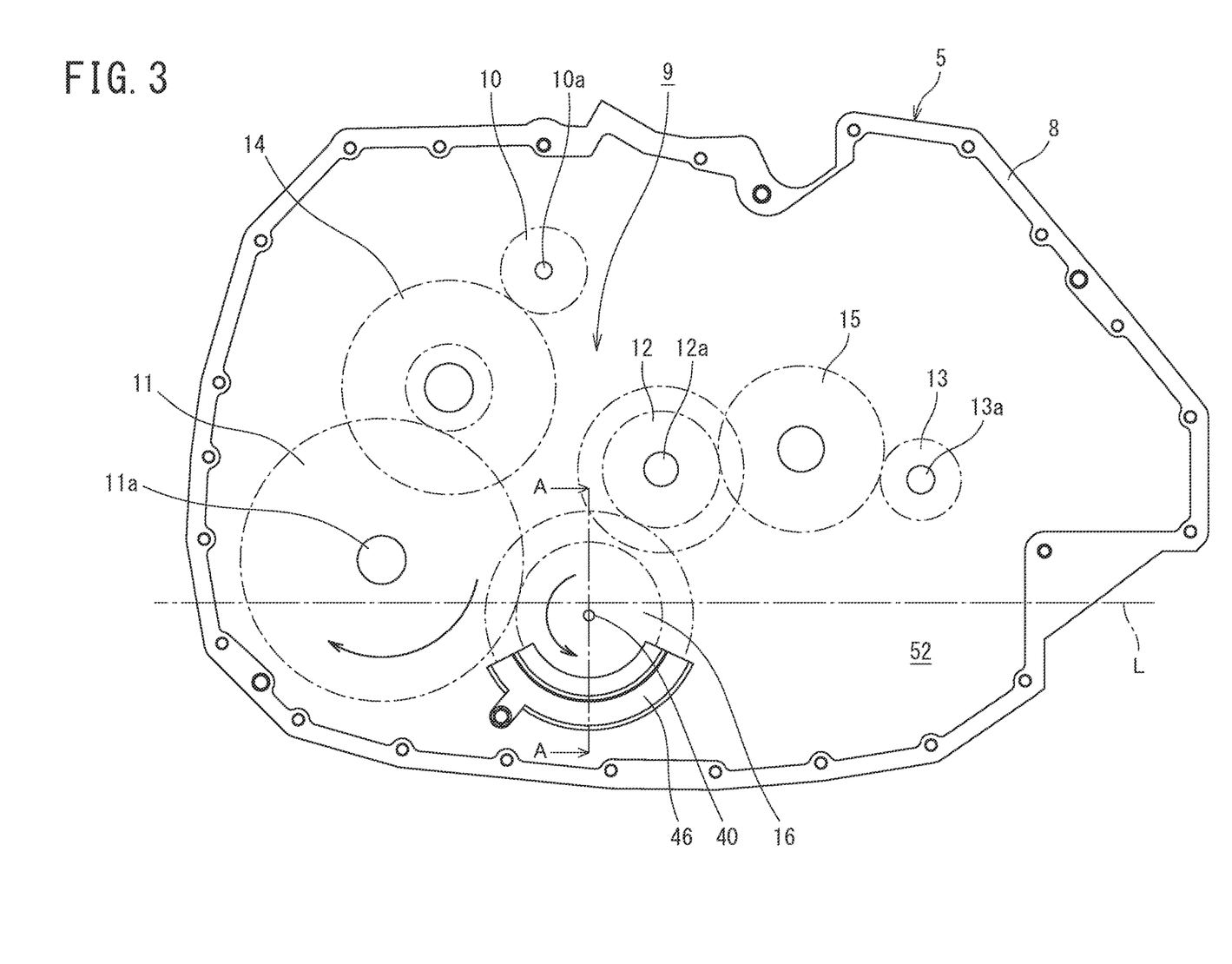
FIG. 3 is a view schematically illustrating an internal configuration of a transmission which constitutes the front unit according to the first embodiment.

FIG. 3 illustrates an internal configuration of the transmission 5. In a transmission case 8, a rotary element train 9 is disposed. The rotary element train 9 is coupled to the first and second motor generators MG1 and MG2, engine 4 and differential 6.

The rotary element train 9 includes a first rotary element 10 which is coupled to the first motor generator MG1 via a rotational shaft 10a; a second rotary element 11 which is coupled to the differential 6 via a rotational shaft 11a; a third rotary element 12 which is coupled to the engine 4 via a rotational shaft 12a; and a fourth rotary element 13 which is coupled to the second motor generator MG2 via a rotational shaft 13a. In addition, in the rotary element train 9, the first rotary element 10 and second rotary element 11 are coupled with each other via a fifth rotary element 14, the third rotary element 12 and fourth rotary element 13 are coupled with each other via a sixth rotary element 15, and the second rotary element 11 and third rotary element 12 are coupled with each other via a transmission mechanism 16.

Here, FIG. 3 illustrates, from a lateral side, the rotary element train 9 which is disposed in the transmission 5. The transmission mechanism 16 is disposed at the lowermost part, and the second rotary element 11 is disposed at a higher position than the transmission mechanism 16. In addition, a lubricating oil 52 is filled in the transmission case 8, up to such a level that the rotational operation shaft 40 of the transmission mechanism 16 is immersed. Note that reference sign L in FIG. 3 denotes an oil level of the lubricating oil 52.

Besides, a baffle plate 46 is disposed in a manner to surround a lower-side region of the transmission mechanism 16.

Figure 4:
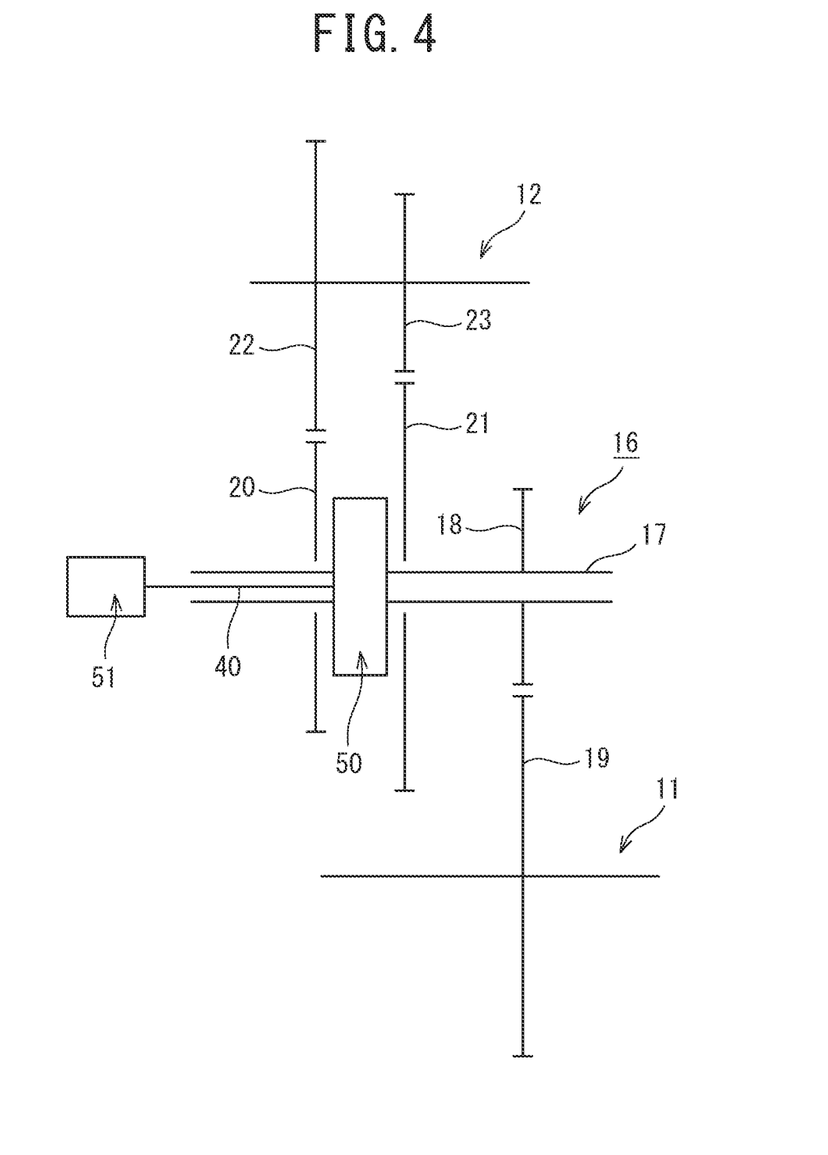
FIG. 4 is a skeleton diagram illustrating a portion of a rotary element train according to the first embodiment.

As illustrated in FIG. 4, in the transmission mechanism 16, an input gear 18 is coaxially fixed to an outer periphery on one end side of an input shaft 17. The input gear 18 is meshed with a rotary element output gear 19 of the second rotary element 11.

In addition, a first output gear 20 is coaxially disposed on the outer periphery on the other end side of the input shaft 17, such that the first output gear 20 is rotatable relative to the input shaft 17. A second output gear 21, which has a greater gear diameter than the first output gear 20, is disposed on the outer periphery of the input shaft 17 between the first output gear 20 and input gear 18, such that the second output gear 21 is rotatable relative to the input shaft 17.

A first input gear 22 of the third rotary element 12 is meshed with the first output gear 20 of the transmission mechanism 16, and a second input gear 23 of the third rotary element 12 is meshed with the second output gear 21.

Further, the transmission mechanism 16 includes a gear select clutch 50, and a clutch operation unit 51 which operates the gear select clutch. The gear select clutch 50 selects a first gear change by which the first output gear 20 and input gear 18 are set in a coupled state, a second gear change by which the second output gear 21 and input gear 18 are set in a coupled state, or a neutral state in which each of the first output gear 20 and second output gear 21 is decoupled from the input gear 18.

Next, referring to FIG. 5 to FIG. 10, a concrete configuration of the transmission mechanism 16 will be described in detail.

Figure 5:
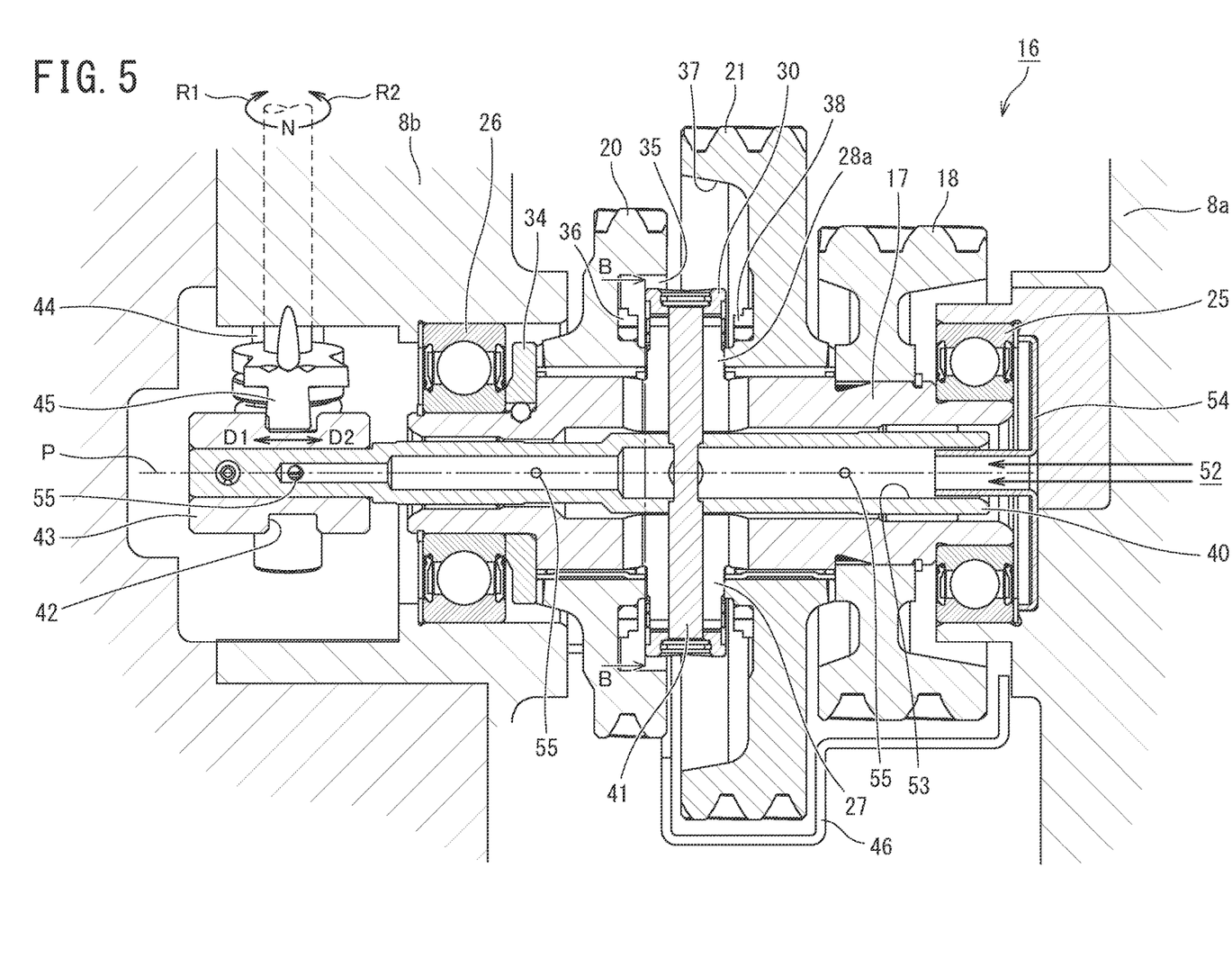
FIG. 5 is a view of taken along arrows A-A in FIG. 3, illustrating a transmission mechanism according to the first embodiment.

As illustrated in FIG. 5, one end in an axis P direction of the input shaft 17 having a hollow cylindrical shape is rotatably supported on a case inner wall 8a via a radial bearing 25, and the other end in the axis P direction of the input shaft 17 is rotatably supported on a case inner wall 8b via a radial bearing 26.

Figure 6:
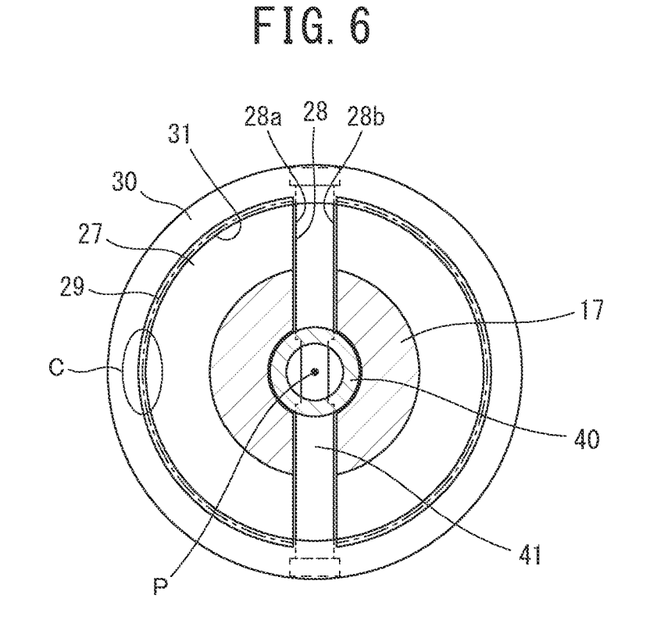
FIG. 6 is a view taken along arrows B-B in FIG. 5.

As illustrated in FIG. 5 and FIG. 6, a disk-shaped guide portion 27, which projects radially outward, is formed on an outer periphery of an axially central portion of the input shaft 17.

A shaft slide gap portion 28 is formed in the guide portion 27 in a manner to penetrate up to the outer periphery in a direction perpendicular to the axis P direction. In the shaft slide gap portion 28, a pair of slide surfaces 28a and 28b are formed which are parallel to each other along the axis P and are continuous up to both end faces in the axis P direction of the guide portion 27.

Guide-side splines 29 with spline teeth 29a extending in the axis P direction are formed on an outer periphery of the guide portion 27.

Clutch-side splines 31 of an annular clutch sleeve 30 are meshed with the guide-side splines 29 of the guide portion 27.

Figure 7:
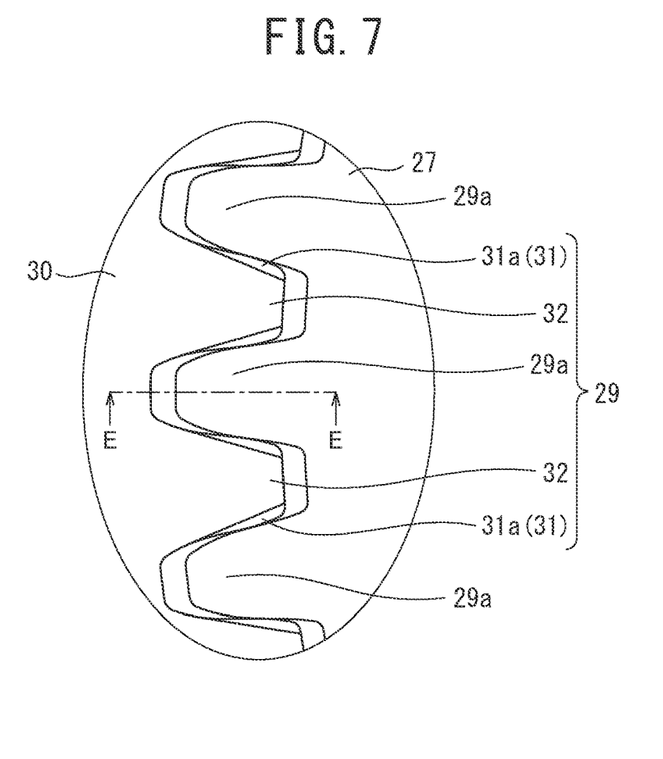
FIG. 7 is a view of a sixth variation of the first embodiment.
Figure 8:
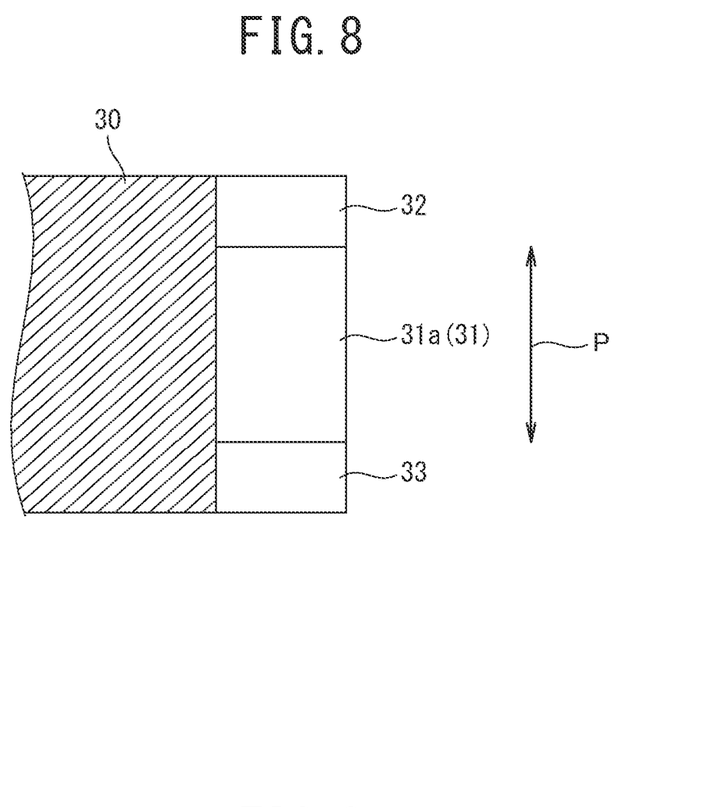
FIG. 8 is a view taken along arrows E-E in FIG. 6, in which illustration of a guide-side spline is omitted.

As illustrated in FIG. 7 and FIG. 8, clutch-side splines 31 including spline teeth 31a, which are meshed with the spline teeth 29a of the guide-side splines 29, and clutch-side dog teeth 32 and 33 on both end portions in the axis P direction of each spline tooth 31a, are formed on the inner periphery of the clutch sleeve 30.

As illustrated in FIG. 7, the clutch-side dog tooth 32, 33 is a tooth having a less width than the width of the shape of the spline tooth 31a of the clutch-side spline 31, and is designed to have a planar distal end. In addition, a gear-side dog tooth has the same shape.

As illustrated in FIG. 5, the input gear 18 is fixed to the outer periphery on the one-end side (radial bearing 25 side) in the axis P direction of the input shaft 17.

The first output gear 20, as illustrated in FIG. 5, is disposed to be rotatable relative to the outer periphery of the input shaft 17, in a state in which the first output gear 20 is put in contact with a spacer 34, which is in contact with an inner ring of the radial bearing 26, and is put in contact with one end face in the axis P direction of the guide portion 27 of the input shaft 17.

A first receiving recess portion 35 is formed by reducing the wall thickness of that surface side of the first output gear 20, which is opposed to the guide portion 27 and clutch sleeve 30. Portions of the guide portion 27 and clutch sleeve 30 enter the first receiving recess portion 35.

Figure 9:
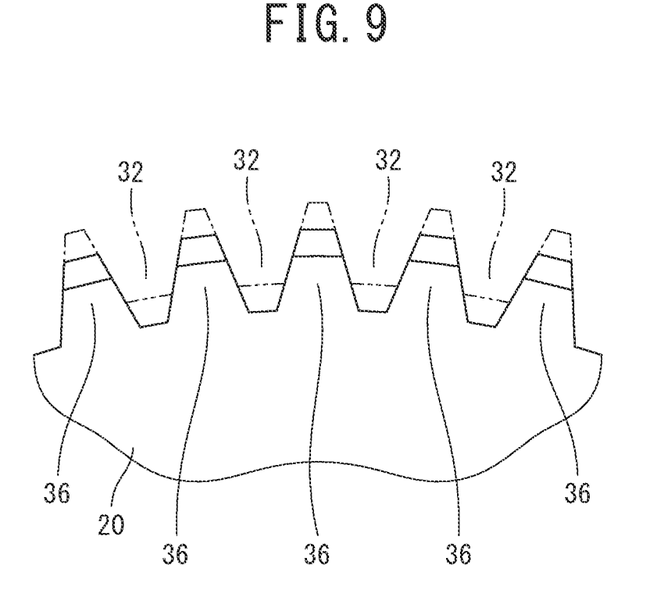
FIG. 9 is a view illustrating gear-side dog teeth of a second gear.

Gear-side dog teeth 36, which are engaged with the clutch-side dog teeth 32 of the clutch sleeve 30, are formed in the inside of the first receiving recess portion 35 (see FIG. 9).

The second output gear 21 is disposed to be rotatable relative to the outer periphery of the input shaft 17, in a state in which the second output gear 21 is put in contact with that surface of the input gear 18 fixed on the one end side in the axis P direction of the input shaft, which faces the guide portion 27, and the other end face in the axis P direction of the guide portion 27 of the input shaft 17.

A second receiving recess portion 37 is formed by also reducing the wall thickness of that surface side of the second output gear 21, which is opposed to the guide portion 27 and clutch sleeve 30. Portions of the guide portion 27 and clutch sleeve 30 enter the second receiving recess portion 37.

Figure 10:
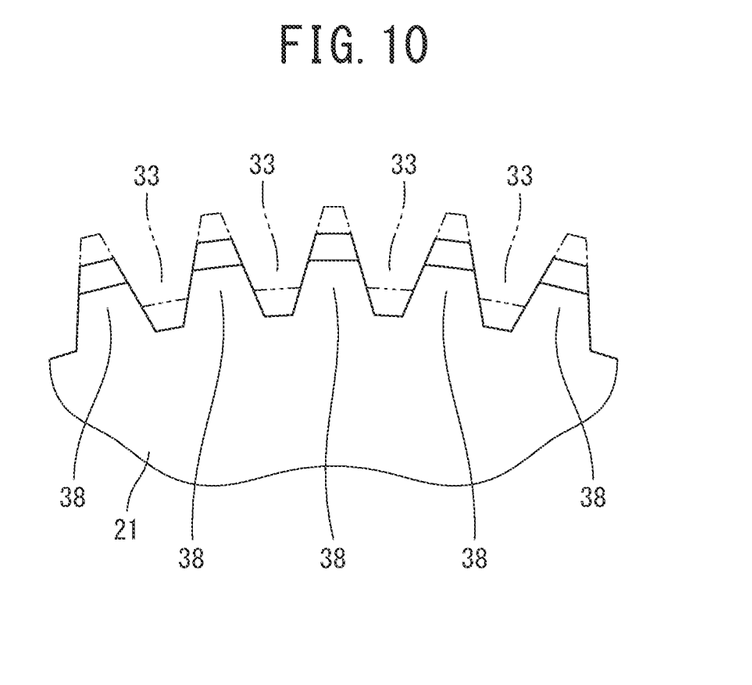
FIG. 10 is a view illustrating gear-side dog teeth of a third gear.

Gear-side dog teeth 38, which are engaged with the clutch-side dog teeth 33 of the clutch sleeve 30, are formed in the inside of the second receiving recess portion 37 (see FIG. 10).

In addition, as illustrated in FIG. 5, an operation shaft 40 is coaxially inserted in the hollow-cylindrical input shaft 17.

An oil conduit 53 is formed within the operation shaft 40 along the axis P from one end portion on the side of the radial bearing 25, which supports the input shaft 17, to the other end portion side.

As illustrated in FIG. 5 and FIG. 6, a sleeve coupling shaft 41 is coupled to the operation shaft 40. The sleeve coupling shaft 41 penetrates the operation shaft 40 in a direction perpendicular to the axis P and passes through the shaft slide gap portion 28, and the clutch sleeve 30 is fixed to both ends of the sleeve coupling shaft 41.

An oil channel 54 for passing the lubricating oil 52 into the oil conduit 53 from the outside is attached to one end portion of the operation shaft 40 on the radial bearing 25 side, and oil ports 55 for supplying the lubricating oil 52, which has flown in the oil conduit 53, to the outside of the operation shaft 40 are formed at a plurality of positions along the axis P.

In addition, the baffle plate 46 is disposed in a manner to surround lower-side regions of the second output gear 21 and input gear 18 of the transmission mechanism 16.

On the other hand, if a gear change control signal is input from a gear change control device (not illustrated), rotation in an R1 direction or rotation in an R2 direction is transmitted to a rotary member 44 via a gear change transmitting mechanism (not illustrated).

A thrust conversion member 45, which is rotatably engaged in a circumferential groove 42 of a thrust movement member 43, is coupled to the rotary member 44.

Then, if the rotary member 44 rotates in the R1 direction, the thrust movement member 43 moves in a first gear change direction D1. If the rotary member 44 rotates in the R2 direction, the thrust movement member 43 moves in a second gear change direction D2.

Here, the gear select clutch 50 illustrated in FIG. 4 includes the gear-side dog teeth 36 disposed in the first receiving recess portion 35 of the first output gear 20; the gear-side dog teeth 38 disposed in the second receiving recess portion 37 of the second output gear 21; the guide portion 27 of the input shaft 17; the clutch sleeve 30 which is supported by the guide portion 27 and slides in the axis P direction; and the clutch-side dog teeth 32 and 33 which are provided on the clutch sleeve 30 and are meshed with either the gear-side dog teeth 36 or gear-side dog teeth 38.

In addition, the clutch operation unit 51 illustrated in FIG. 4 includes the operation shaft 40, sleeve coupling shaft 41, thrust movement member 43, rotary member 44 and thrust conversion member 45.

Besides, a rotational shaft described in the claims corresponds to the input shaft 17, a first gear described in the claims corresponds to the input gear 18, a second gear described in the claims corresponds to the first output gear 20, and a third gear described in the claims corresponds to the second output gear.

Next, referring to FIG. 5, a description will be given of an operation of the transmission mechanism 16 at a time when a control signal of a gear change operation (first gear change or second gear change) was input from the gear change control device.

If the control signal for the first gear change is input from the gear change control device, a rotational force in the R1 direction from a neutral position N is transmitted to the rotary member 44 via the gear change transmitting mechanism. If the rotary member 44 rotates in the R1 direction from the neutral position N, the thrust conversion member 45, to which the rotation was transmitted from the rotary member 44, moves the thrust movement member 43 in the first gear change direction D1.

If the thrust movement member 43 moves in the first gear change direction D1, the operation shaft 40, which is fixed to the thrust movement member 43, also moves in the same direction (the left direction in FIG. 5) along the axis P direction.

If the operation shaft 40 moves in the first gear change direction D1, the sleeve coupling shaft 41, which is coupled to the operation shaft 40, moves toward the first output gear 20 while sliding on the pair of slide surfaces 28a and 28b of the shaft slide gap portion 28.

With the sleeve coupling shaft 41 moving toward the first output gear 20, the clutch sleeve 30, which is fixed to the sleeve coupling shaft 41, also moves toward the first output gear 20.

At this time, since the clutch-side splines 31, which are formed on the inner periphery of the clutch sleeve 30, are meshed with the guide-side splines 29 of the guide portion 27 which is formed integral with the input shaft 17, the clutch sleeve 30 moves toward the first output gear 20 while being guided by the guide-side splines 29.

Then, the clutch-side dog teeth 32 formed at distal ends of the clutch-side splines 31 of the clutch sleeve 30 are meshed with the gear-side dog teeth 36 of the first output gear 20. Thereby, the first output gear 20 and input gear 18 enter the coupled state via the gear-side dog teeth 36, the clutch-side dog teeth 32, the clutch-side splines 31 of the clutch sleeve 30, the guide-side splines 29 of the guide portion 27, and the input shaft 17. Thus, the switching operation of the first gear change is completed.

Next, if the control signal for switching to the second gear change is input from the gear change control device, a rotational force in the R2 direction is first transmitted to the rotary member 44 via the gear change transmitting mechanism, and the rotary member 44 rotates to the neutral position N. If the rotary member 44 rotates to the neutral position N, the thrust movement member 43 moves to the neutral position via the thrust conversion member 45, the clutch sleeve 30 is separated from the first output gear 20, and the gear-side dog teeth 36 of the first output gear 20 and the clutch-side dog teeth 32 of the clutch sleeve 30 are disengaged.

Subsequently, the rotation in the R2 direction from the neutral position N is transmitted to the rotary member 44 via the gear change transmitting mechanism. If the rotary member 44 rotates in the R2 direction from the neutral position N, the thrust conversion member 45, to which the rotation was transmitted from the rotary member 44, moves the thrust movement member 43 in the second gear change direction D2.

If the thrust movement member 43 moves in the second gear change direction D2, the operation shaft 40, which is fixed to the thrust movement member 43, also moves in the same direction (the right direction in FIG. 5) along the axis P direction. In addition, the sleeve coupling shaft 41, which is coupled to the operation shaft 40, moves toward the second output gear 21 while sliding on the pair of slide surfaces 28a and 28b of the shaft slide gap portion 28.

With the sleeve coupling shaft 41 moving toward the second output gear 21, the clutch sleeve 30, which is fixed to the sleeve coupling shaft 41, also moves toward the second output gear 21. In this case, too, the clutch sleeve 30 moves toward the second output gear 21 while being guided by the guide-side splines 29.

Then, the clutch-side dog teeth 33 formed at distal ends of the clutch-side splines 31 of the clutch sleeve 30 are meshed with the gear-side dog teeth 38 of the second output gear 21. Thereby, the second output gear 21 and input gear 18 enter the coupled state via the gear-side dog teeth 38, the clutch-side dog teeth 33, the clutch-side splines 31 of the clutch sleeve 30, the guide-side splines 29 of the guide portion 27, and the input shaft 17. Thus, the switching operation of the second gear change is completed.

Here, in switching between the first gear change and the second gear change of the transmission mechanism 16, by making substantially uniform the rotations of the input shaft 17 and the first output gear 20 or second output gear 21, it becomes possible to smoothly perform, without the need for a synchronization mechanism, the engagement between the clutch-side dog teeth 32 of the clutch sleeve 30 and the gear-side dog teeth 36 of the first output gear 20, or the engagement between the clutch-side dog teeth 33 of the clutch sleeve 30 and the gear-side dog teeth 38 of the second output gear 21.

As illustrated in FIG. 3, with the second rotary element 11, the input gear 18 of the transmission mechanism 16, the first output gear 20 and the second output gear 21 being rotated by the rotation of the differential 6, the oil level L of the lubricating oil 52 filled in the transmission case 8 varies.

Here, by the baffle plate 46 that is disposed in a manner to surround the lower regions of the second output gear 21 and input gear 18, the transmission mechanism 16 can suppress the lubricating oil 52 around the transmission mechanism 16, which is carried up by the second output gear 21 and input gear 18. This makes it easier for the lubricating oil 52 to flow toward the second rotary element 11 side. Accordingly, the lubricating oil 52 is supplied to the second rotary element 11 side, and the lubricating oil 52 that is supplied by the second rotary element flows from the oil channel 54 into the oil conduit 53 via the transmission case 8.

In addition, as illustrated in FIG. 4 and FIG. 5, the lubricating oil 52 in the transmission case 8, which has been carried up by the respective gears such as the transmission mechanism 16 and second rotary element 11, flows into the oil conduit 53 from the oil channel 54 which is attached to the end portion of the operation shaft 40 of the transmission mechanism 16. The lubricating oil 52, which has flowed into the oil conduit 53 of the operation shaft 40, flows out to the outside of the operation shaft 40 from the oil ports 55 formed in the operation shaft 40. Further, the lubricating oil 52, which has flowed out to the outside of the operation shaft 40 from the oil ports 55, flows radially by the rotation of the input shaft 17, and reaches each bearing, the slide portion between the circumferential groove 42 of the thrust movement member 43 and the thrust conversion member 45, the clutch-side dog teeth 32 and 33 of the clutch sleeve 30, the gear-side dog teeth 36 of the first output gear 20, and the gear-side dog teeth 38 of the second output gear 21.

Next, the advantageous effects of the transmission mechanism 16 of the first embodiment will be described.

The gear select clutch 50 is disposed between the first output gear 20 and second output gear 21. The clutch operation unit 51 is disposed in the input shaft 17, and is advanced and retreated in the axis P direction. Thereby, the gear select clutch 50 is operated. Since the mechanism for controlling a gear change is not disposed on the outside of the input shaft 17, first output gear 20 and second output gear 21, there can be provided the transmission mechanism 16 which is small in size and compact.

In addition, the transmission mechanism 16 is formed such that portions of the guide portion 27 and clutch sleeve 30 enter the first receiving recess portion 35 which is formed in the first output gear 20, and portions of the guide portion 27 and clutch sleeve 30 also enter the second receiving recess portion 37 which is formed in the second output gear 21. Thus, the dimension in the axis P direction is decreased, and there can be provided the transmission mechanism 16 which is smaller in size.

Besides, the clutch-side splines 31, which are formed on the inner periphery of the clutch sleeve 30, are meshed with the guide-side splines 29 of the guide portion 27 which are formed integral with the input shaft 17. The clutch sleeve 30 moves toward the first output gear 20 or the second output gear 21 along the axis P direction, while being guided by the guide-side splines 29. Thus, the clutch sleeve 30 can be smoothly moved in the axis P direction.

Additionally, the clutch-side dog tooth 32, which is engaged with the gear-side dog tooth 36 of the first output gear 20, and the clutch-side dog tooth 33, which is engaged with the gear-side dog tooth 38 of the second output gear 21, are formed on both end portions of the clutch-side spline 31 of the clutch sleeve 30, and the synchronization device is not provided. Thus, the decrease in the dimension in the axis P direction of the gear select clutch 50 can be promoted, and the transmission mechanism 16 can be further reduced in size.

Additionally, the clutch operation unit 51 is configured to include the operation shaft 40 forming a double-pipe structure with the input shaft 17; the sleeve coupling shaft 41 which couples the operation shaft 40 and clutch sleeve 30; the thrust movement member 43 which moves the operation shaft 40 in the axis P direction; the rotary member 44; and the thrust conversion member 45. Thus, a simple operation mechanism, which does not require a large operation space, can be provided.

Below is a list of reference numbers used in the drawings.
1 Vehicle
2FL Left front wheel
2FR Right front wheel
2BL Left rear wheel
2BR Right rear wheel
3 Front unit
MG1 First motor generator
MG2 Second motor generator
4 Engine
5 Transmission
6 Differential
7 Axle
7 Transmission case
8a, 8b Case inner wall
9 Rotary element train
10a Rotational shaft
10 First rotary element
11a Rotational shaft
11 Second rotary element
12a Rotational shaft
12 Third rotary element
13a Rotational shaft
13 Fourth rotary element
14 Fifth rotary element
15 Sixth rotary element
16 Transmission mechanism
17 Input shaft
18 Input gear
19 Rotary element output gear
20 First output gear
21 Second output gear
22 First input gear
23 Second input gear 25 Radial bearing
26 Radial bearing
27 Guide portion
28 Shaft slide gap portion
28a, 28b Pair of slide surfaces
29a Spline teeth
29 Guide-side splines
30 Clutch sleeve
31a Spline teeth
31 Clutch-side splines
32, 33 Clutch-side dog teeth
34 Spacer
35 First receiving recess portion
36 Gear-side dog teeth
37 Second receiving recess portion
38 Gear-side dog teeth
40 Operation shaft
41 Sleeve coupling shaft
42 Circumferential groove
43 Thrust movement member
44 Rotary member
45 Thrust conversion member
46 Baffle plate
50 Gear select clutch
51 Clutch operation unit
52 Lubricating oil
53 Oil conduit
54 Oil channel
55 Oil ports

The invention claimed is:

1. A transmission mechanism comprising:
a first gear coaxially fixed to a rotational shaft having a hollow shape, a second gear and a third gear, the second gear and the third gear being rotatably and coaxially disposed on an outer periphery of the rotational shaft such that the second gear and the third gear are opposed to each other;
a gear select clutch disposed between the second gear and the third gear, and configured to select one of a state in which the second gear and the first gear are coupled and the third gear and the first gear are decoupled, and a state in which the third gear and the first gear are coupled and the second gear and the first gear are decoupled;
a clutch operation unit configured to couple an operation shaft disposed in a hollow part of the rotational shaft to the gear select clutch to operate the gear select clutch by advancing and retreating the operation shaft in an axial direction;
an oil conduit formed through the operation shaft in the axial direction;
an oil channel, attached to one end portion of the operation shaft, for passing lubricating oil into the oil conduit;
an oil port, formed on the operation shaft, for passing the lubricating oil out of the oil conduit;
a baffle plate disposed to surround lower-side regions of the first gear and the third gear, wherein:
a width of the third gear in the axial direction is larger than a width of the second gear in the axial direction,
recess portions are provided in mutually opposed surfaces of the second gear and the third gear, respectively, a depth in the axial direction of the recess portion of the third gear being larger than a depth in the axial direction of the recess portion of the second gear,
the gear select clutch is disposed in a manner to enter an inside of each of the recess portions of the second gear and the third gear such that a center in the axial direction of the gear select clutch is positioned in the inside of the recess portion of the third gear when the first gear is decoupled from the second gear and the third gear,
first gear-side dog teeth are formed in the recess portion of the second gear,
second gear-side dog teeth are formed in the recess portion of the third gear,
the gear select clutch includes:
a guide portion formed to project radially outward from the outer periphery of the rotational shaft;
a clutch sleeve disposed on an outer periphery of the guide portion, and configured such that rotation of the clutch sleeve relative to the guide portion is restricted and the clutch sleeve moves in the axial direction by being guided by the guide portion; and
first clutch-side dog teeth and second clutch-side dog teeth, which are meshed with the first gear-side dog teeth and the second gear-side dog teeth, respectively, are formed on both ends in the axial direction of the clutch sleeve,
guide-side splines are formed on the outer periphery of the guide portion,
clutch-side splines to be meshed with the guide-side splines are formed on an inner periphery of the clutch sleeve, and
the clutch-side splines are sandwiched between the first clutch-side dog teeth and the second clutch-side dog teeth in the axial direction on the inner periphery of the clutch sleeve.

2. The transmission mechanism according to claim 1, wherein:
the clutch operation unit is configured to mesh either a pair of the first gear-side dog teeth and the first clutch-side dog teeth with each other or a pair of the second gear-side dog teeth and the second clutch-side dog teeth with each other, by moving the clutch sleeve in the axial direction toward one of the second gear and the third gear.

3. The transmission mechanism according to claim 2, wherein the clutch operation unit includes:
a sleeve coupling shaft perpendicularly penetrating the operation shaft disposed in the hollow part of the rotational shaft, passing through a shaft slide gap portion provided in the guide portion, and being fixed to the clutch sleeve; and
a thrust movement mechanism configured to advance and retreat the operation shaft in the axial direction,
wherein the clutch sleeve is advanced and retreated between the second gear and the third gear by advancing and retreating, by an operation of the thrust movement mechanism, the sleeve coupling shaft in the shaft slide gap portion in the axial direction via the operation shaft.

4. The transmission mechanism according to claim 1, wherein the clutch operation unit includes:
a sleeve coupling shaft perpendicularly penetrating the operation shaft disposed in the hollow part of the rotational shaft, passing through a shaft slide gap portion provided in the guide portion, and being fixed to the clutch sleeve; and
a thrust movement mechanism configured to advance and retreat the operation shaft in the axial direction,
wherein the clutch sleeve is advanced and retreated between the second gear and the third gear by advancing and retreating, by an operation of the thrust movement mechanism, the sleeve coupling shaft in the shaft slide gap portion in the axial direction via the operation shaft.

* * * * *